United States Patent Office 3,154,241
Patented Oct. 27, 1964

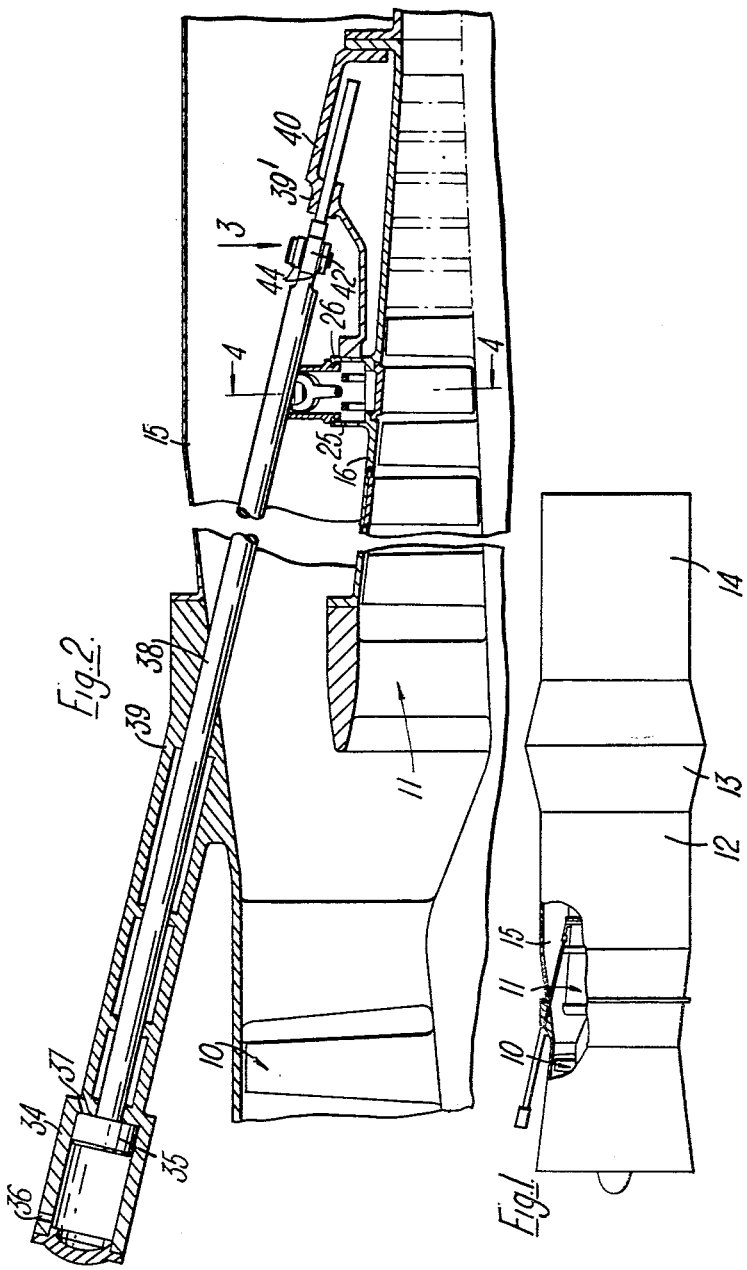

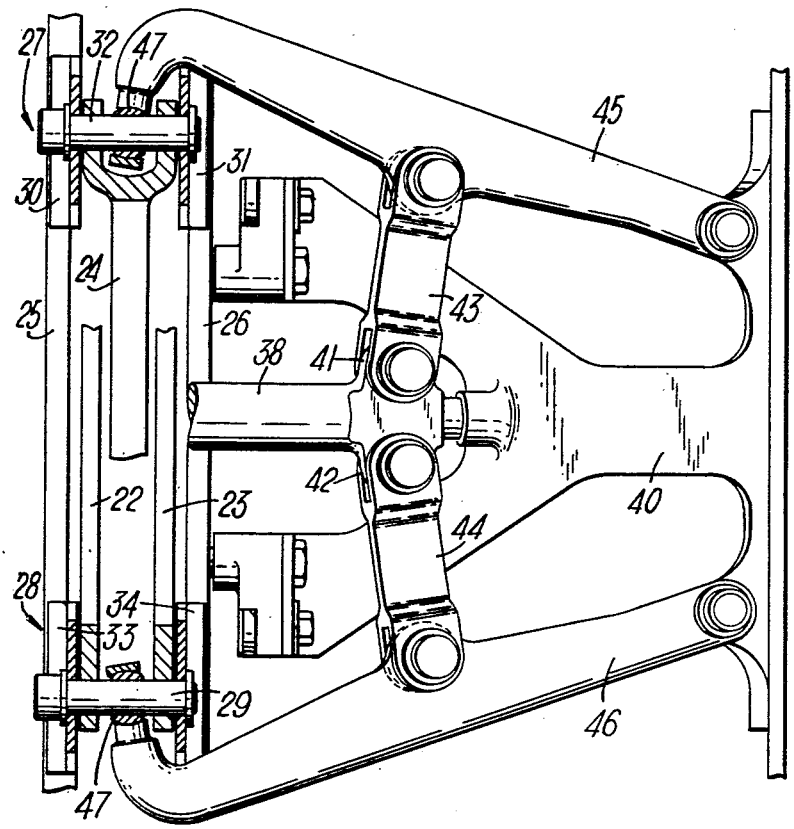

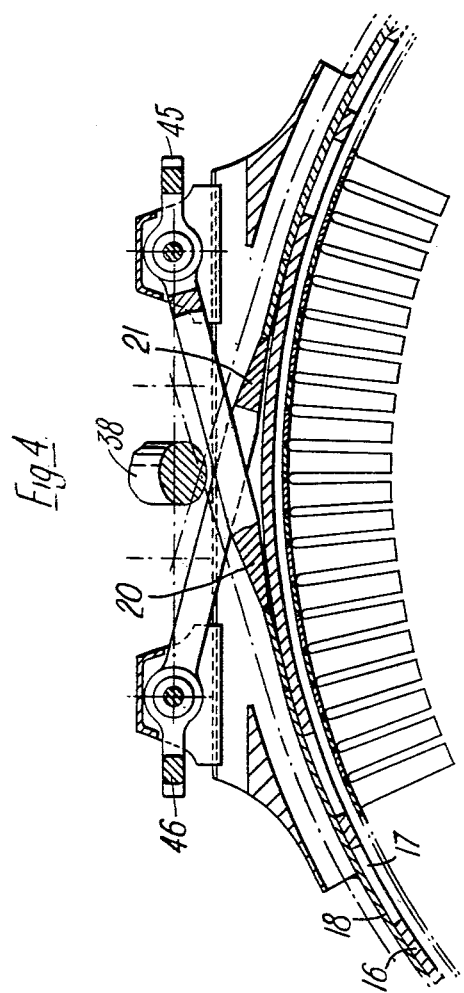

3,154,241
COMPRESSORS OF GAS TURBINE ENGINES
Nelson Hector Kent and Edward Reginald Brealey, Derby, and John Ingram, Mickleover, Derby, England, assignors to Rolls-Royce Limited, Derby, England, a company of Great Britain
Filed June 5, 1961, Ser. No. 114,925
Claims priority, application Great Britain June 7, 1960, 19,991/60
5 Claims. (Cl. 230—114)

This invention, which is concerned with the compressors of gas turbine engines, is an improvement in or modification of the co-pending United States patent application serially numbered 808,656 of Richard Derby Beale et al. and filed April 24, 1959, which issued as Patent Number 3,074,432 on January 22, 1963.

According to the present invention, there is provided a compressor for a gas turbine engine comprising an apertured compressor casing, a valve band encircling the compressor casing, two slider members which are mounted on said compressor casing for circumferential sliding movement towards and away from each other, and power means for causing the said movement of the slider members, the slider members being respectively connected to opposite ends of the valve band so that the said movement of the slider members causes the valve band to be moved circumferentially and radially between positions in which it respectively seals and unseals the apertures.

It should be understood that the term "valve band" as used in this specification is intended to cover a band having two separate portions each of which may, for example, be pivotally mounted at its end remote from the respective slider member. It is preferred, however, to employ a valve band consisting of one unitary part.

Since the valve band is moved partially radially between the positions in which the apertures are sealed and unsealed, this movement produces no friction between the valve band and the compressor casing and may therefore be performed swiftly and easily. Such swift-movement of the valve band is important if turbulence and other undesirable flow characteristics in the engine are to be avoided.

Preferably the said power means is arranged to produce sliding movement of a rod substantially axially of the compressor, the rod being connected by a linkage to said sliding members so that movement of the rod in one direction causes the slider members to move towards each other and movement of the rod in the opposite direction causes the slider members to move away from each other.

The said linkage is preferably a toggle linkage. Thus the slider members may be connected by substantially axially extending levers to fixed structure, the rod being connected by substantially radially extending links to said levers.

The power means preferably comprises a pressure fluid operated piston and cylinder device.

The invention also comprises a gas turbine engine provided with a compressor (e.g. a high pressure compressor) as set forth above.

Thus the gas turbine engine may be a by-pass engine having a by-pass duct communicating with said apertures, the said rod extending across the by-pass duct and the power means being arranged externally of the by-pass duct.

It will be appreciated that, in this construction, the by-pass duct of the engine need be obstructed only to a very small extent.

The invention is illustrated, merely by way of example, in the accompanying drawings, in which:

FIGURE 1 is a diagrammatic side view, partly in section, of a gas turbine engine incorporating a compressor according to the present invention, FIGURE 2 is a broken away longitudinal section showing part of the structure illustrated in FIGURE 1, FIGURE 3 is a plan view, partly in section, looking in the direction of the arrow 3 of FIGURE 2, and FIGURE 4 is a section taken on the line 4—4 of FIGURE 2.

Referring first to FIGURE 1, a gas turbine, jet propulsion engine for an aircraft comprises in flow series a low pressure compressor 10, a high pressure compressor 11, combustion equipment 12, and turbines 13, the turbine exhaust gases being directed to atmosphere through a jet pipe 14.

A by-pass duct 15 communicates at its upstream end with the space between the low pressure compressor 10 and the high pressure compressor 11. The duct 15 is arranged to cause some of the air compressed by the low pressure compressor 10 to by-pass the high pressure compressor 11, the combustion equipment 12, and the turbines 13. The air so by-passed is either directed into the jet pipe 14, so as to mix with the jet gases therein, or is directed to atmosphere so as to form an annulus about the jet gases.

The high pressure compressor 11 has a compressor casing 16 which is provided with a plurality of angularly spaced apart apertures 17 (FIGURE 4). The apertures 17, which communicate with the by-pass duct 15, may be sealed and unsealed by a band valve 18.

The opposite ends of the band valve 18 are welded to straps 20, 21, which cross over each other, the strap 21 having spaced end portions 22, 23 (FIGURE 3) between which passes an end portion 24 of the strap 20.

The compressor casing 16 is provided with parallel, circumferentially extending rails 25, 26 on which are slidably mounted slider members 27, 28. The slider member 27 is of inverted channel shape and has side walls 30, 31 which are adapted to run on the rails 25, 26 and which are connected by a pin 32 in which is rotatably mounted the end portion 24 of the strap 20. Similarly, the slider member 28 is of inverted channel shape and has side walls 33, 34 which are adapted to run on the rails 25, 26 and which are connected by a pin 29 on which are rotatably mounted the end portions 22, 23 of the strap 21.

Mounted externally of the by-pass duct 15 is a cylinder 34 within which works a piston 35. Pneumatic or hydraulic pressure fluid (from a source not shown) may be admitted to and exhausted from the cylinder 34 via ports 36, 37.

The piston 35 has a piston rod 38 which is journalled in a bearing member 39 and which extends substantially axially across the by-pass duct 15. The piston rod 38 is also slidably mounted in a bearing 39' forming part of a bracket 40 carried externally of the compressor casing 16.

The piston rod 38 is provided adjacent the bracket 40 with a pair of oppositely directed lugs 41, 42 which are pivotally connected to toggle links 43, 44 respectively. The toggle links 43, 44 extend substantially radially and are pivotally connected to side levers 45, 46 respectively which extend substantially axially of the engine on opposite sides of the piston rod 38. Each of the side levers 45, 46 is pivoted at one end to the brackets 40, the other ends of the side levers 45, 46 being cranked inwardly and being mounted on the pins 32, 29 respectively by way of spherical bearings 47.

The valve band 18 is shown in FIGURE 4 in the position in which it seals the apertures 17 so as to prevent flow of compressed air from the compressor 11 and into the by-pass duct 15. When it is desired to move the valve band to the position in which it unseals the apertures 17, pressure fluid is admitted to the cylinder 34 through the port 37 so as to move the piston 35 towards the left (as seen in FIGURE 2). This causes leftward travel of the piston rod 38, whereby the toggle links 43, 44 force the side levers 45, 46, and hence the slider members 27, 28, towards each other. The movement of the slider members 27, 28 towards each other, however, forces apart the opposite ends of the valve band, whereby the valve band is moved both circumferentially and radially away from the casing 16 so as to permit bleeding of air through the apertures 17.

It will be appreciated that movement of the piston rod 38 in a rightward direction (as seen in FIGURE 2) causes the slider members 27, 28 to move away from each other, whereby the valve band 18 is moved circumferentially and radially into the position in which it seals the apertures 17.

The forces that act on the band may be high and may cause the band to vibrate and shorten the working life of the band. Accordingly the band should be thick enough to prevent the onset of such vibration.

We claim:

1. A compressor for a gas turbine engine comprising: a compressor casing having a plurality of angularly-spaced apart apertures therein, at least one stator and at least one rotor mounted within said casing on the axis of said casing, a valve band encircling said compressor casing and arranged to seal and unseal said plurality of apertures, said valve band having opposite ends which cross over each other, a pair of slider members, arcuate guide means circumscribing at least a portion of said compressor casing, said pair of slider members each being slidably mounted on said arcuate guide means for circumferential movement relative to said compressor casing and for simultaneous movement toward and away from each other, means connecting the said opposite ends of said valve band to said pair of slider members respectively whereby simultaneous movement of said slider members circumferentially toward and away from each other causes said valve band to be moved circumferentially and radially between positions simultaneously unsealing said plurality of apertures and simultaneously sealing said plurality of apertures, and power means operatively connected to said pair of slider members for causing the simultaneous movement of said two slider members.

2. A compressor for a gas turbine engine comprising: a compressor casing having a plurality of angularly spaced apart apertures therein, at least one stator and at least one rotor mounted within said casing on the axis of said casing, a valve band encircling said compressor casing and arranged to seal and unseal said plurality of apertures, said valve band having opposite ends which cross over each other, a pair of slider members, arcuate guide means circumscribing at least a portion of said compressor casing, said pair of slider members each being slidably mounted on said arcuate guide means for circumferential movement relative to said compressor casing and for simultaneous movement toward and away from each other, means connecting the said opposite ends of said valve band to said pair of slider members respectively whereby simultaneous movement of said slider members toward and away from each other causes said valve band to move circumferentially and radially between positions simultaneously unsealing said plurality of apertures, and simultaneously sealing said plurality of apertures, a rod mounted for sliding movement substantially axially of the compressor, a linkage operatively connecting said rod to said pair of slider members, and power means operatively connected to said rod for selectively causing sliding movement of the rod in one direction to cause the linkage to move said slider members toward each other and in an opposite direction to cause said linkage to move said slider members away from each other.

3. A compressor as claimed in claim 2 in which the said linkage is a toggle linkage.

4. A compressor for a gas turbine engine comprising: a compressor casing having a plurality of angularly spaced apart apertures therein, at least one stator and at least one rotor mounted within said casing on the axis of said casing, a valve band encircling said compressor casing and arranged to seal and unseal said plurality of apertures, said valve band having opposite ends which cross over each other, a pair of slider members, arcuate guide means circumscribing at least a portion of said compressor casing, said pair of slider members each being slidably mounted on said arcuate guide means for circumferential movement relative to said compressor casing and for simultaneous movement toward and away from each other, means connecting the said opposite ends of said valve band to said pair of slider members respectively whereby simultaneous movement of said slider members toward and away from each other causes said valve band to move circumferentially and radially between positions simultaneously unsealing said plurality of apertures and simultaneously sealing said plurality of apertures, a pair of pivot levers extending substantially axially of the compressor casing and having pivot axes fixed with respect to the compressor casing, said pivot levers being connected to said pair of slider members respectively, a rod mounted for sliding movement substantially axially of the compressor, a pair of substantially radially extending links connecting said rod to said pivot levers respectively, and power means operatively connected to said rod for selectively causing sliding movement of the rod in one direction to cause said pair of links and said pair of pivot rods to move said slider members toward each other and in an opposite direction to cause said pair of links and said pivot rods to move said sliding members away from each other.

5. A compressor as claimed in claim 4 in which the power means comprises a pressure fluid operated piston and cylinder device.

References Cited in the file of this patent
UNITED STATES PATENTS

| | | |
|---|---|---|
| 798,805 | Kurlfinke | Sept. 5, 1905 |
| 1,239,194 | Loomis | Sept. 4, 1917 |
| 1,601,737 | Johnson | Oct. 5, 1926 |
| 2,469,712 | Buck | May 10, 1949 |
| 2,672,726 | Wolf | Mar. 23, 1954 |
| 2,682,789 | Ochtman | July 6, 1954 |
| 2,682,934 | Howard | July 6, 1954 |
| 2,698,711 | Newcomb | Jan. 4, 1955 |
| 2,703,477 | Anxionnaz | Mar. 8, 1955 |
| 2,799,289 | Mustee | July 16, 1957 |
| 2,955,680 | Caero | Oct. 11, 1960 |